United States Patent [19]

Ostrowski

[11] 4,095,682
[45] Jun. 20, 1978

[54] SHOCK ABSORBER WITH IMPROVED POSITION SENSITIVE ASSEMBLY

[75] Inventor: Michael H. Ostrowski, Glen Ellyn, Ill.

[73] Assignee: Maremont Corporation, Chicago, Ill.

[21] Appl. No.: 794,021

[22] Filed: May 5, 1977

[51] Int. Cl.² ............................................. F16F 9/342
[52] U.S. Cl. ..................................... 188/289; 188/322
[58] Field of Search ....................... 188/289, 317, 322; 267/8 A; 213/43, 223

[56] References Cited

U.S. PATENT DOCUMENTS

| 1,567,515 | 12/1925 | Kijima et al. | 188/322 |
| 1,856,753 | 5/1932 | Elsey | 188/289 |
| 3,003,595 | 10/1961 | Patriquin | 188/289 |
| 3,147,826 | 9/1964 | McHenry | 188/289 |

FOREIGN PATENT DOCUMENTS 920,534  10/1954  Germany ............................. 188/289

Primary Examiner—Edward R. Kazenske
Attorney, Agent, or Firm—Cushman, Darby & Cushman

[57] ABSTRACT

A direct acting hydraulic shock absorber having an improved assembly for mounting (1) one end of a fluid metering element with an end of the inner tubular member of the shock absorber adjacent the lower end closure fixed thereto and (2) the compression and replenishing valve mechanisms in hydraulic fluid flow control relation between the reservoir space and the compression space of the shock absorber. The assembly comprises a lower annular wall member mounted adjacent the lower end closure having a lower surface disposed in fluid communicating relation with the reservoir space, a central recess formed in an upper surface, and a pair of openings spaced from the recess extending from the upper surface to the lower surface, within which the replenishing valve mechanism and compression valve mechanism are mounted. A ball is fixed to one end of the fluid metering element and is seated within the recess. An upper annular wall member is peripherally fixed to the lower member and has (1) an opening in the central portion thereof for enabling the fluid metering element to extend therethrough; (2) an insert therein for grippingly engaging the ball to maintain the same within the recess; and (3) a series of openings between the periphery and the central portion thereof extending axially therethrough.

15 Claims, 8 Drawing Figures

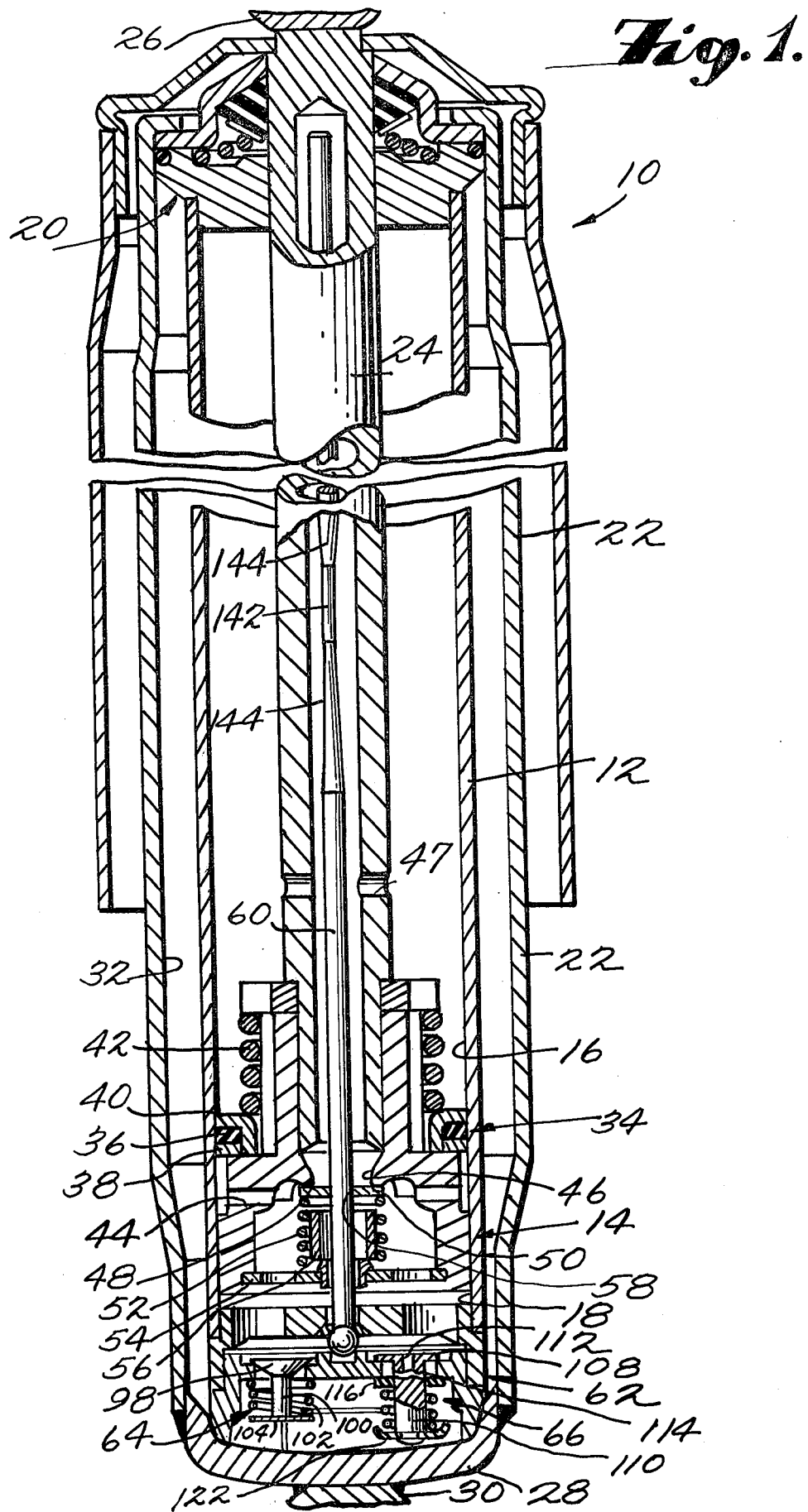

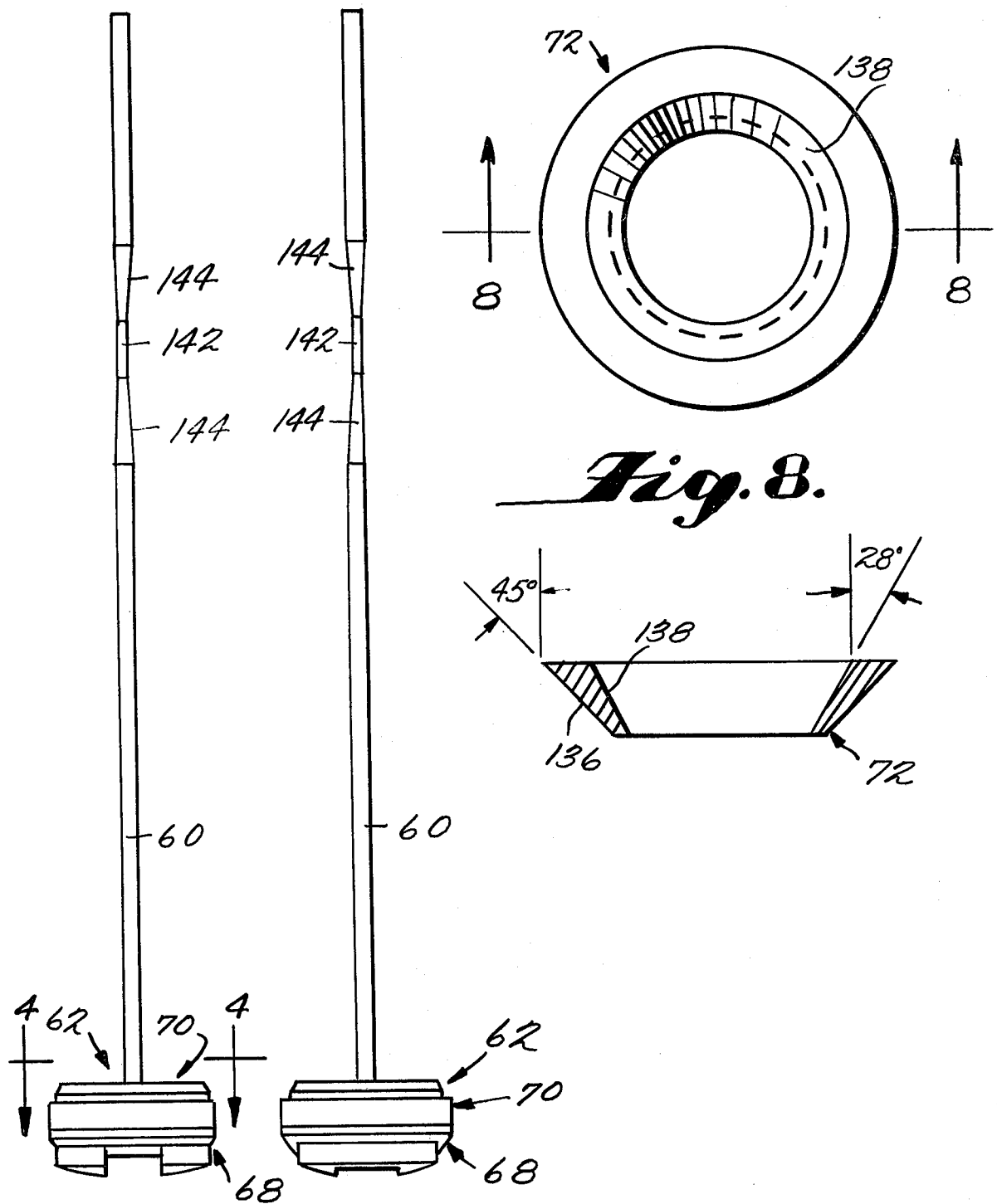

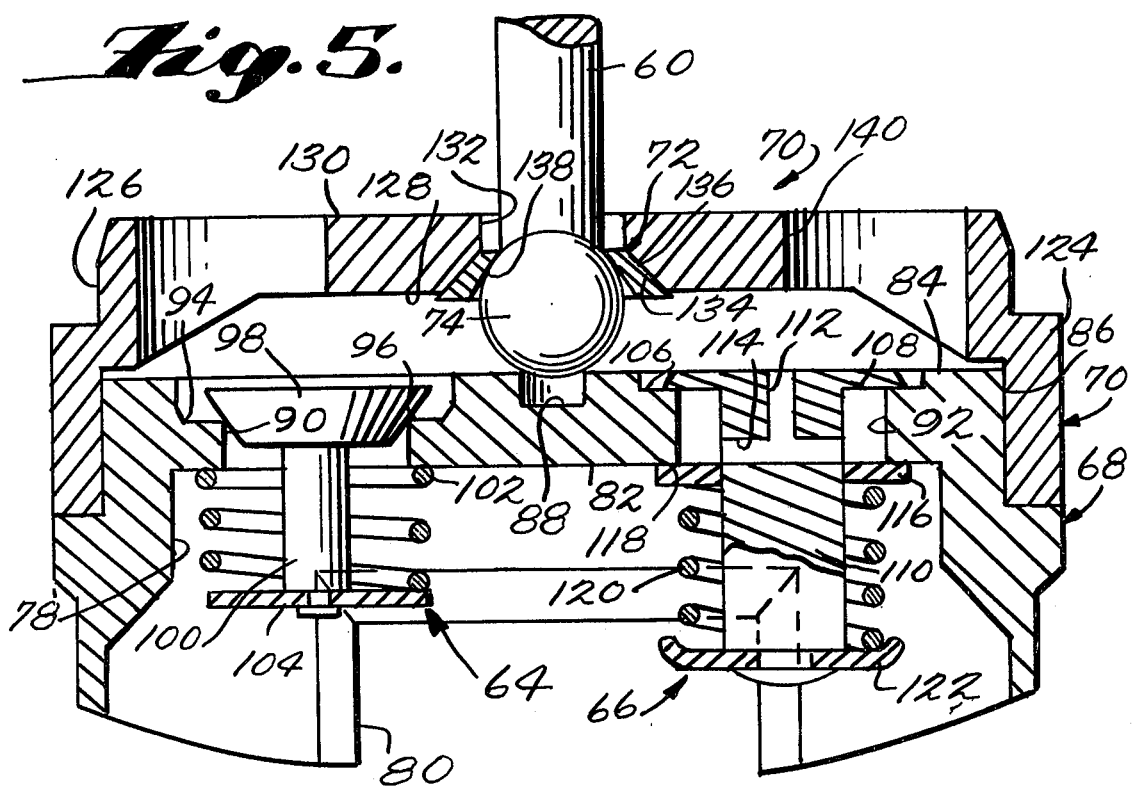
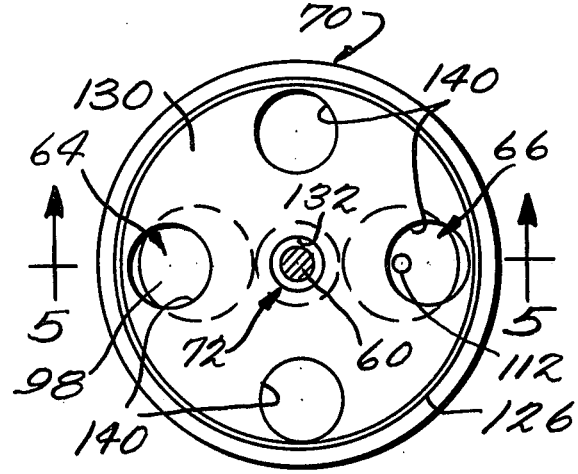
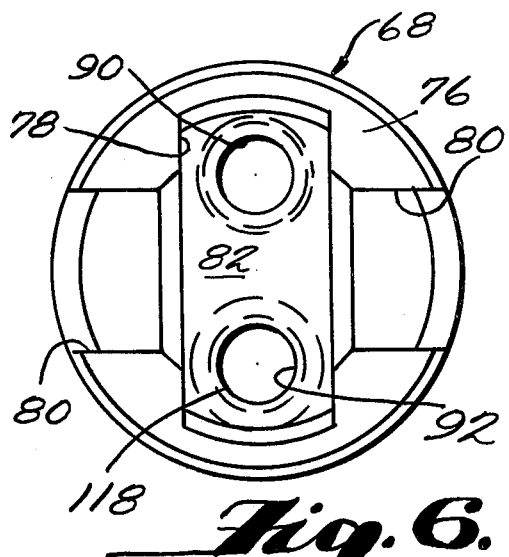

SHOCK ABSORBER WITH IMPROVED POSITION SENSITIVE ASSEMBLY

This invention relates to shock absorbers and more particularly to improvements in shock absorbers of the position sensitive type.

Shock absorbers having position sensitive characteristics have been disclosed in the patented literature for some time. An example of such a disclosure is contained in U.S. Pat. No. 3,003,595. In the aforesaid patent there is disclosed a direct acting shock absorber of the type including inner and outer tubular members defining therebetween an annular replenishing chamber. The inner tubular member defines a cylindrical chamber which is divided into compression and rebound spaces by a piston assembly. A piston rod extends from one side of the piston outwardly through one end wall of the inner tubular member and the opposite end of the cylinder as well as the free end of the piston rod are provided with connectors by means of which the shock absorber is connected between the sprung and unsprung masses of the vehicle. The compression and rebound spaces are filled with hydraulic fluid and appropriate valving is provided for controlling the flow of fluid from the compression space to the rebound space and replenishing space during the compression movement of the shock absorber and from the rebound space and the replenishing space into the compression space during the rebound movement.

In the arrangement shown in the aforesaid patent, the rebound valve for controlling the flow of fluid from the rebound space to the compression space is mounted concentrically within the piston and the piston rod is formed as a hollow member. Position sensitive control is provided by an elongated fluid matering element fixed at one end adjacent the lower end cap of the shock absorber which extends through a central opening formed in the rebound valve and into the hollow piston rod. The hollow piston rod is also provided with radial openings which serve to communicate the interior of the hollow piston rod with the rebound space. In the aforesaid patent the fluid metering element is disclosed as having either a tubular configuration or a rodular configuration. In the tubular arrangement the fixed end of the fluid metering tube is anchored to the central portion of the base valve assembly and flow in an axial direction corresponding to the direction of movement of the shock absorber is allowed to take place on opposite sides of the rebound valve member by means of slots formed in the wall of the metering tube.

In the rodular embodiment (illustrated in FIGS. 6–8), the end of the metering rod is fixed to the central portion of the end cap and the compression valve and replenishing valve normally carried by the base plate are mounted in an annular extension of the inner tubular member. In the rodular arrangement, position sensitive flow is through the opening in the rebound valve past the exterior periphery of the rod.

The advantages of the provision of the fluid metering element are fully stated in the disclosure of the aforesaid patent. Despite the enumerated advantages, the actual utilization of these advantages on the marketplace has not been achieved. Among the reasons attributable to this market situation are the increased manufacturing costs and the lack of consistant performance.

An object of the present invention is to provide a shock absorber of the type described with an improved assembly for mounting both one end of the fluid metering rod within one end of the inner cylindrical member adjacent its end closure and both the compression and replenishing valve means in hydraulic fluid control relation between the reservoir space and the compression space, which achieves all of the advantages heretofore attributable to position sensitive damping characteristics without the disadvantages noted above.

In accordance with the principles of the present invention, this objective is obtained by forming the assembly with a first annular wall member having opposed annular surfaces, a central recess in one of the surfaces, and a pair of openings extending between the surfaces. The openings serve as a means for receiving the replenishing valve and the compression valve respectively. A second annular wall member is provided which has means in the central portion thereof which provides for the extension of the fluid metering rod therethrough and for grippingly engaging a ball fixed to the ajdacent end of the fluid metering rod which is seated within the central recess of the first annular wall member. The assembly further provides for the peripheral securement of the two annular wall members together and to the adjacent end of the inner tubular member of the shock absorber. The second annular wall member is formed with openings between the periphery and central portion which serve to communicate the hydraulic fluid within the compression space with the replenishing and compression valves mounted within the openings in the first annular wall. With this arrangement the components are readily subject to assembly by semiautomatic procedures. The ball joint improves the wear life of the recoil valve by eliminating the possibility of high contact forces being exerted by the fluid metering rod. The elimination of such forces is achieved by virtue of the provision of the ball joint which prevents the transmittal of high torque to the metering pin.

Another object of the present invention is the provision of a shock absorber of the type described having an improved assembly of the type described which is simple in construction, effective in operation and economical to manufacture.

These and other objects of the present invention will become more apparent during the course of the following detailed description and appended claims. The invention may best be understood with reference to the accompanying drawings wherein an illustrative embodiment is shown.

In the drawings

FIG. 1 is a vertical sectional view of a shock absorber including the improved assembly, embodying the principles of the present invention;

FIG. 2 is an elevational view of the assembly of the present invention;

FIG. 3 is a view similar to FIG. 2 showing the assembly in a position rotated 90° about its axis;

FIG. 4 is an enlarged sectional view taken along the line 4—4 of FIG. 2;

FIG. 5 is an enlarged fragmentary sectional view taken along the line 5—5 of FIG. 4;

FIG. 6 is a bottom view of the lower annular wall member of the assembly;

FIG. 7 is a bottom view of the ball engaging insert of the assembly; and

FIG. 8 is a sectional view taken along the line 8—8 of FIG. 7.

Referring now more particularly to FIG. 1 of the drawings, there is shown therein a direct action hydraulic shock absorber, generally indicated at 10, adapted to be connected between the sprung and unsprung masses of a vehicle, which embodies the principles of the present invention.

In general, it can be stated that the unit 10 is constructed in the manner set forth in commonly-assigned U.S. Pat. No. 3,003,595, and hence the disclosure of this patent is hereby incorporated by reference into the present specification. For present purposes it is sufficient to note that the shock absorber 10 includes an inner tubular member 12, which defines a cylindrical chamber within which is slidably mounted a piston assembly 14. The piston 14 divides the cylinder into an upper rebound space 16 and a lower compression space 18. The upper end of the tubular member 12 has an end closure assembly 20 fixed thereto, which end closure assembly also receives the upper end of an outer tubular member 22.

The end closure assembly 20 serves to slidably sealingly engage the exterior periphery of a hollow piston rod 24 which extends into the rebound space 16 and is suitably connected with the piston assembly 14. The outer end of the piston rod has an appropriate connector 26 fixed thereon which serves to connect the shock absorber 10 to the sprung mass of the vehicle. The lower end of the outer tubular member 22 has an end cap or closure 28 fixed thereto which, in turn, has a connector 30 fixed to the central exterior thereof for connecting the lower end of the shock absorber 10 with the unsprung mass of the vehicle.

It will be understood that the rebound and compression spaces 16 and 18 are filled with hydraulic fluid, which hydraulic fluid also partially fills a replenishing space 32 formed between the exterior of the inner tubular member 12 and the outer tubular member 22. In order to control the flow of hydraulic fluid from the compression space 18 into the rebound space 16 during the compression movement of the shock absorber 10, there is provided in the piston 14 an appropriate spring pressed piston compression valve mechanism, generally indicated at 34. As shown, the piston compression valve mechanism 34 includes an annular seal 36 which sealingly engages the inner cylindrical periphery 16 of the tubular member 12. The annular seal seats between two annular elements 38 and 40 and the arrangement is spring urged, as by coil spring 42, into engagement with an upwardly facing annular surface formed on the piston. Hydraulic fluid is communicated to the peripheral seal arrangement by a plurality of openings 44 extending through the piston 14 in a position radially outwardly from a central passage 46 formed therein. As shown, the central passage 46 communicates with the hollow interior of the piston rod 24 which, in turn, communicates with the rebound space above the piston seal arrangement by a plurality of radially extending openings 47 in the piston rod.

The piston 14 also defines an annular valve seat 48 which is disposed intermediate the opposite ends of the piston in surrounding relation to the central passage 46. A rebound disk valve 50 is disposed in cooperating relation with the valve seat 48. As best shown in FIG. 1, the valve 50 is resiliently urged into engagement with the seat 48 by a coil spring 52, one end of which engages the valve 50 and the opposite end of which engages an insert spider 54 fixed within the adjacent end of the piston assembly 14. Preferably, an annular guide element 56 is provided for the purpose of centralizing the spring and limiting the downward movement of the valve 50. The rebound valve 50 is formed with a central opening 58 through which extends a metering rod 60. The metering rod also extends through the central passage 46 in the piston and into the hollow interior of the piston rod 24.

In accordance with the principles of the present invention there is provided an improved assembly, generally indicated at 62, which serves to mount (1) one end of the fluid metering rod 60 within the end of the inner tubular member 12 adjacent the end closure 28 and (2) a replenishing valve assembly, generally indicated at 64 and a compression valve assembly, generally indicated at 66, in hydraulic fluid flow controlled relation between the reservoir space 32 and the compression space 18.

The assembly 62 includes, in general, a first lower annular wall member 68, a second upper annular wall member 70, a ball engaging insert 72 and a ball 74 which is fixed to the end of the metering rod 60. As best shown in FIGS. 5 and 6, the lower member 68 includes a lower surface 76 which is shaped to engage the upper surface of the end closure 28. Formed in the central portion of the surface 76 is a recess 78 which is elongated in a radial direction with respect to the axis of the annular member. The surface 76 also includes a pair of aligned radially extending slots 80 which extend from the periphery into communication with the recess 78 in a radial direction displaced 90° with respect to the radial direction of elongation of the recess 78. The slots 80 provide for the communication of hydraulic fluid between a downwardly facing surface 82 formed by the recess 78 and the replenishing space 32 when the lower member 68 is mounted in operative position within the end cap 28 as shown. The member 68 includes an upwardly extending annular surface 84 which is peripherally defined by a peripheral groove 86. Formed in the central portion of the surface 84 is a ball receiving recess or socket 88 of a size smaller than the diameter size of the ball 74. Extending between the surfaces 84 and 82 on opposite sides of the recess 88 is a pair of openings 90 and 92. As shown, the opening 90 has a counterbore 94 extending downwardly from the associated surface 84 which defines with the opening 84 an annular valve seat 96.

The replenishing valve assembly 64 includes a replenishing valve member 98 seated on the annular valve seat 96 and having a valve stem 100 extending downwardly therefrom. A coil spring 102 is disposed in surrounding relation to the valve stem 100 with its upper surface engaging the surface 82 surrounding the opening 90 and its lower surface engaging a washer 104 fixedly carried by the lower end of the stem 100. It can be seen that the arrangement is such that the spring 102 serves to mount and maintain the replenishing valve 98 in operative closed position in engagement with the valve seat 96.

The opening 92 has a counterbore 106 formed in the adjacent surface 84 and extending downwardly therefrom for the purpose of receiving a head or annular flange 108 of an elongated cylindrical valve stem 110 forming a part of the compression valve assembly 66. As shown, the valve stem 110 extends downwardly from the flange 108 through the opening 92 and therebelow. The portion of the valve stem 110 disposed above the lower surface 82 defining the opening 92 is formed with a central opening 112 having a plurality of radially extending openings 114 communicating with the lower end thereof. Slidably mounted on the remaining part of the valve stem 110 is an annular compression valve member 116. It will be noted that the annular marginal portion of the surface 82 surrounding the opening 92 is relieved to form an annular seal 118 for engagement by the upper surface of the annular compression valve member 116. A coil spring 120 is disposed in surrounding relation with the valve stem 110 and has its upper end in engagement with the lower surface of the annular compression valve member 116 and its lower end engaged with a washer 122 fixed to the lower end of the valve stem 110.

The upper annular wall member 70 includes a downwardly extending peripheral skirt 124 which is adapted to seat within the annular groove 86 of the lower member 68 so as to effect a rigid securement of the two members together. It will also be noted that the upper annular member provides an upwardly facing peripheral groove 126 disposed above the annular skirt 124 for fixedly receiving the lower end of the inner tubular member 12 of the shock absorber. The annular members 68 and 80 are thus peripherally interconnected together between the upper periphery of the end cap 28 and the lower periphery of the inner cylindrical member 12 of the shock absorber.

The upper member 70 includes a lower annular surface 128 which is centrally relieved in an upward direction and an upper annular surface 130. Extending centrally through the annular member 70 between surfaces 128 and 130 is an opening 132 of a diameter size greater than the diameter size of the metering rod 60 so as to permit the same to extend therethrough. The lower portion of the opening 132 is countersunk, as indicated at 134, to receive therein an outer frustoconical peripheral surface 136 of the ball engaging insert 72. The insert also includes an inner ball engaging frustoconical surface 138. Preferably the insert is made of a plastic material, an examplary embodiment being Delrin ®. Exemplary angular dimensions of the inner frustoconical surface are approximately 28°, whereas the outer frustoconical surface has an angle of approximately 45°.

The upper annular member 70 also includes a plurality of openings 140 extending between the surfaces 128 and 130 in equal circumferentially spaced relation about the central opening 132. These openings serve to communicate the hydraulic fluid in the compression space 18 with the upper surface 84 of the lower member 68 and hence the replenishing and compression valve assemblies 64 and 66 carried thereby.

With reference to FIGS. 1–3, it will be noted that the metering rod 60 includes a short central section 142 of reduced diameter which is positioned longitudinally so as to engage within the opening 58 in the rebound valve 50 when the shock absorber is disposed substantially in a central normal position. Disposed on opposite sides of the reduced central section 142 are frustoconical sections 144. It can be seen that the components of the assembly 62 are susceptible to simple assembly procedures. The elements of the replenishing valve assembly 64 are mounted within the opening 90 of the lower member 68 in the same manner as the replenishing valve of the aforesaid patent is mounted within the base member of the embodiment shown in FIGS. 1–5. Likewise, the compression valve assembly 66 is mounted within the opening 92 of the lower member 68 in the same manner as the compression valve of the patent. Next, the insert 72 and upper member 70 are slipped over the end of the metering rod 60 opposite from the ball 74. Then, the annular skirt 124 of the upper member is press fit into the annular groove 86 of the lower member while insuring that the ball 74 seats within the central recess 88. The assembly 62 is then capable of being mounted between the end cap 28 and the adjacent end of the inner tubular member 12 of the shock absorber during the normal assembly thereof as with the base member of the aforesaid patent illustrated in FIGS. 1–5.

It will be understood that the metering rod 60 of the present invention has a functional relationship with respect to the opening 58 in the rebound valve 50 which is similar to that of the metering rod in the embodiment of FIGS. 6–8 of the aforesaid patent. Thus, the central section 142 provides for the passage of hydraulic fluid between the rebound and compression spaces 16 and 18 independently of the seated or unseated condition of the rebound valve 50 when the piston 14 is in its predetermined central position within the inner tubular member 12 and for such passage therethrough of a gradually diminishing volume when the piston 14 moves in the inner tubular member 12 in either direction from the predetermined position beyond a predetermined extent (determined by the axial length of the section 142) so that the shock absorber characteristics produced under the control of the rebound valve 50 and the piston compression valve mechanism 34 are supplemented and altered regardless of the seated condition of the rebound valve 50 or the piston valve mechanism 34 and in accordance with the position and displacement of the piston 14 in the inner tubular member 12.

The ball connection of the metering rod 60 within the shock absorber provided by the assembly 62 insures that the torque forces will not be transmitted to the metering rod and hence excessive wear characteristics resulting from excessive contact forces imposed on the opening 58 by the metering rod are eliminated.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A direct acting hydraulic shock absorber adapted to be connected between the sprung and unsprung masses of a vehicle comprising:
   inner and outer tubular members,
   said inner tubular member defining a cylindrical chamber,
   a piston slidably mounted within said cylindrical chamber,
   a piston rod extending from one side of said piston outwardly from one end of said inner tubular member,
   closure means on said one end of said inner tubular member closing the adjacent end of said outer tubular member and slidably sealingly engaging said piston rod,
   connecting means on the end of said piston rod for connecting said shock absorber to one of said masses,
   an end closure on the opposite end of said outer tubular member,
   connecting means on said end closure for connecting said shock absorber to the other of said masses,
   hydraulic fluid filling rebound and compression spaces within said cylindrical chamber on the piston rod side of said piston and on the opposite side thereof respectively and partially filling an annular reservoir space between said inner and outer tubular members, said piston having a central passage therethrough and an annular valve seat intermediate the opposite ends thereof surrounding said central passage, a rebound valve in said piston disposed in cooperating relation with said valve seat, spring means on said piston acting on said rebound valve to maintain the same seated on said valve seat with a predetermined spring force, said piston having compression passage means extending therethrough radially outwardly of said central passage, spring pressed piston valve means controlling said compression passage means, compression valve means between said compression space and said reservoir space, replenishing valve means between said compression space and said reservoir space, said rebound valve having a central opening therein, a fluid metering element extending longitudinally through said central opening and cooperating therewith independently of the seated or unseated condition of said rebound valve to provide for the passage through said central opening of a maximum volume of hydraulic fluid between said rebound and compression spaces when said piston is in a predetermined position within said inner tubular member and for such passage therethrough of a gradually diminishing volume when said piston moves in said inner tubular member in either direction from said predetermined position beyond a predetermined extent whereby the shock absorber's characteristics produced under the control of said rebound valve and said piston valve means are supplemented and altered regardless of the seated condition of said rebound valve or said piston valve means and in accordance with the position and displacement of said piston in said inner tubular member, the improvement which comprises an assembly for mounting (1) one end of said fluid metering element within the end of said inner tubular member adjacent said end closure and (2) said compression and replenishing valve means in hydraulic fluid flow control relation between said reservoir space and said compression spaces, said assembly comprising a first annular wall member mounted adjacent said end closure having first surface means facing said end closure disposed in fluid communicating relation with said reservoir space, second surface means facing in a direction away from said end closure and toward said piston, a central recess formed in said second surface means, and a pair of openings spaced from said recess extending from said second surface means to said first surface means, means mounting said replenishing valve means in operative relation within one of said pair of openings, means mounting said compression valve means in operative relation within the other of said pair of openings, a ball fixed to said one end of said fluid metering element and seated within said recess, a second annular wall member having means in the central portion thereof for (1) enabling said fluid metering element to extend therethrough and (2) grippingly engaging said ball to maintain the same within said recess, means for peripherally securing said second annular wall member to said first annular wall member and to the adjacent end of said inner tubular member, said second annular wall member having opening means between the periphery and the central portion thereof extending axially therethrough for communicating the hydraulic fluid within said compression space with the second surface means of said first annular wall member.

2. The improvement as defined in claim 1 wherein said peripheral securing means includes an annular skirt formed on the periphery of one of said annular wall members, the other of said annular wall members having an annular groove formed in the periphery thereof fixedly receiving said annular skirt therein.

3. The improvement as defined in claim 2 wherein said peripheral securing means further includes said second annular wall member having an annular groove formed in the periphery thereof within which the adjacent end of said inner tubular member is fixedly engaged.

4. The improvement as defined in claim 3 wherein said fluid metering element is a rod of cylindrical exterior configuration having a centrally located longitudinal cylindrical section of reduced diameter and a frustoconical section extending from each end of said cylindrical section.

5. The improvement as defined in claim 4 wherein said means for grippingly engaging said ball comprises an annular insert mounted within a central opening in said second annular wall member.

6. The improvement as defined in claim 5 wherein the central opening in said second annular wall member includes a frustoconical countersunk portion, said annular insert having a frustoconical periphery seated in said frustoconical countersunk portion.

7. The improvement as defined in claim 6 wherein the inner periphery of said annular insert is frustoconical.

8. The improvement as defined in claim 7 wherein the frustoconical outer periphery of said annular insert is inclined at an angle of approximately 45° with respect to the annular axis thereof and the frustoconical inner periphery is inclined at an angle of approximately 28°.

9. The improvement as defined in claim 8 wherein said insert is made of plastic material.

10. The improvement as defined in claim 1 wherein said fluid metering element is a rod of cylindrical exterior configuration having a centrally located longitudinal cylindrical section of reduced diameter and a frustoconical section extending from each end of said cylindrical section.

11. The improvement as defined in claim 1 wherein said means for grippingly engaging said ball comprises an annular insert mounted within a central opening in said second annular wall member.

12. The improvement as defined in claim 11 wherein the central opening in said second annular wall member includes a frustoconical countersunk portion, said annular insert having a frustoconical periphery seated in said frustoconical countersunk portion.

13. The improvement as defined in claim 12 wherein the inner periphery of said annular insert is frustoconical.

14. The improvement as defined in claim 13 wherein the frustoconical outer periphery of said annular insert is inclined at an angle of approximately 45° with respect to the annular axis thereof and the frustoconical inner periphery is inclined at an angle of approximately 28°.

15. The improvement as defined in claim 14 wherein said insert is made of plastic material.

* * * * *